United States Patent
Koelzer et al.

(10) Patent No.: US 10,589,842 B2
(45) Date of Patent: Mar. 17, 2020

(54) SPINNERS FOR USE ON TILTROTOR AIRCRAFT

(71) Applicant: Textron Innovations Inc., Providence, RI (US)

(72) Inventors: Helmuth Peter Koelzer, Fort Worth, TX (US); Brendan Patrick Lanigan, Fort Worth, TX (US); Michael Kenneth Farrell, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 553 days.

(21) Appl. No.: 15/605,545

(22) Filed: May 25, 2017

(65) Prior Publication Data

US 2018/0339762 A1    Nov. 29, 2018

(51) Int. Cl.
*B64C 11/14* (2006.01)
*B64C 29/00* (2006.01)
*F03D 1/06* (2006.01)
*B64C 11/00* (2006.01)

(52) U.S. Cl.
CPC .......... *B64C 11/14* (2013.01); *B64C 29/0033* (2013.01); *B64C 11/00* (2013.01); *F03D 1/06* (2013.01)

(58) Field of Classification Search
CPC ......... B64C 11/00; B64C 11/02; B64C 11/14; B64C 29/0033; B64C 29/0075; B64C 11/04; B64C 23/06
See application file for complete search history.

(56) References Cited

U.S. PATENT DOCUMENTS

| 2,346,680 A | | 4/1944 | Elwood | |
|---|---|---|---|---|
| 2,408,677 A | * | 10/1946 | Owner | B64C 11/14 416/239 |
| 2,780,297 A | * | 2/1957 | Barish | B64C 11/14 416/245 R |

(Continued)

FOREIGN PATENT DOCUMENTS

| GB | 155902 A | * | 12/1920 | ............. B64C 11/04 |
|---|---|---|---|---|
| GB | 518873 A | | 3/1940 | |
| GB | 566427 A | * | 12/1944 | ............. B64C 11/14 |

OTHER PUBLICATIONS

European Search Report; Application No. 17208887.4; European Patent Office; dated Mar. 9, 2018.

(Continued)

*Primary Examiner* — Christopher D Hutchens
(74) *Attorney, Agent, or Firm* — Lawrence Youst PLLC

(57) ABSTRACT

A proprotor assembly for a tiltrotor aircraft having a forward flight mode. The proprotor assembly includes a spinner subjected to freestream airflow during forward flight. The spinner is elongated to form a tapered leading portion and a substantially cylindrical aft portion. The spinner forms a plurality of rotor blade cutouts exposing an inner chamber. The proprotor assembly includes a plurality of proprotor blade assemblies protruding radially from the spinner through the rotor blade cutouts. The rotor blade cutouts are formed at the substantially cylindrical aft portion of the spinner to reduce the freestream airflow into the inner chamber via the rotor blade cutouts during forward flight, thereby reducing drag experienced by the tiltrotor aircraft.

19 Claims, 6 Drawing Sheets

(56) References Cited

U.S. PATENT DOCUMENTS

| | | | | |
|---|---|---|---|---|
| 3,081,964 A | * | 3/1963 | Quenzler | ............ B64C 29/0033 |
| | | | | 244/51 |
| 3,228,476 A | * | 1/1966 | Brown | .................... B64C 11/14 |
| | | | | 416/94 |
| 4,171,183 A | * | 10/1979 | Cornell | ................... B64C 11/00 |
| | | | | 416/223 R |
| 2011/0158808 A1 | | 6/2011 | Henze | |
| 2013/0287576 A1 | | 10/2013 | Stamps et al. | |
| 2016/0076629 A1 | | 3/2016 | Modrzejewski et al. | |

OTHER PUBLICATIONS

European Exam Report; Application No. 17208887.4; European Patent Office; dated Mar. 26, 2018.
Farrell, Michael K., Aerodynamic Design of the V-22 Osprey Proprotor, American Helicopter Society, Boston, MA, May 22-24, 1989.

\* cited by examiner

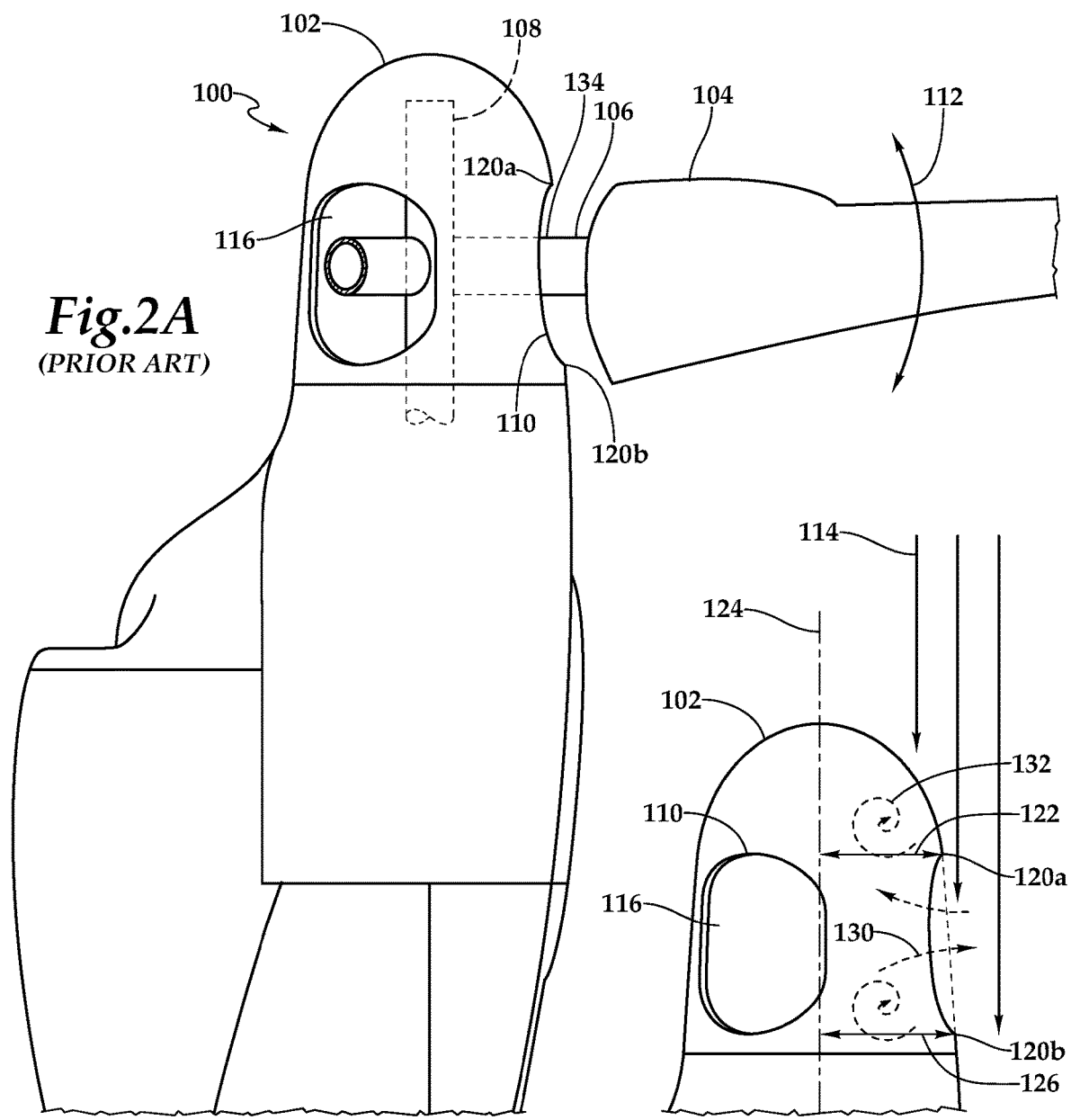
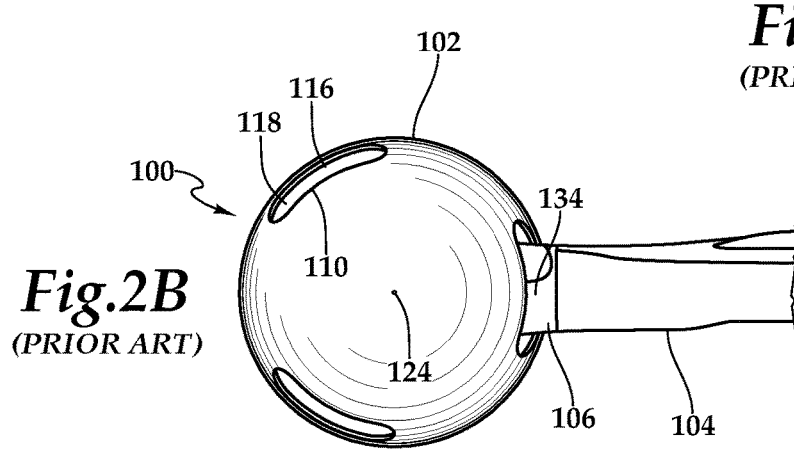
Fig.2A (PRIOR ART)
Fig.2C (PRIOR ART)
Fig.2B (PRIOR ART)

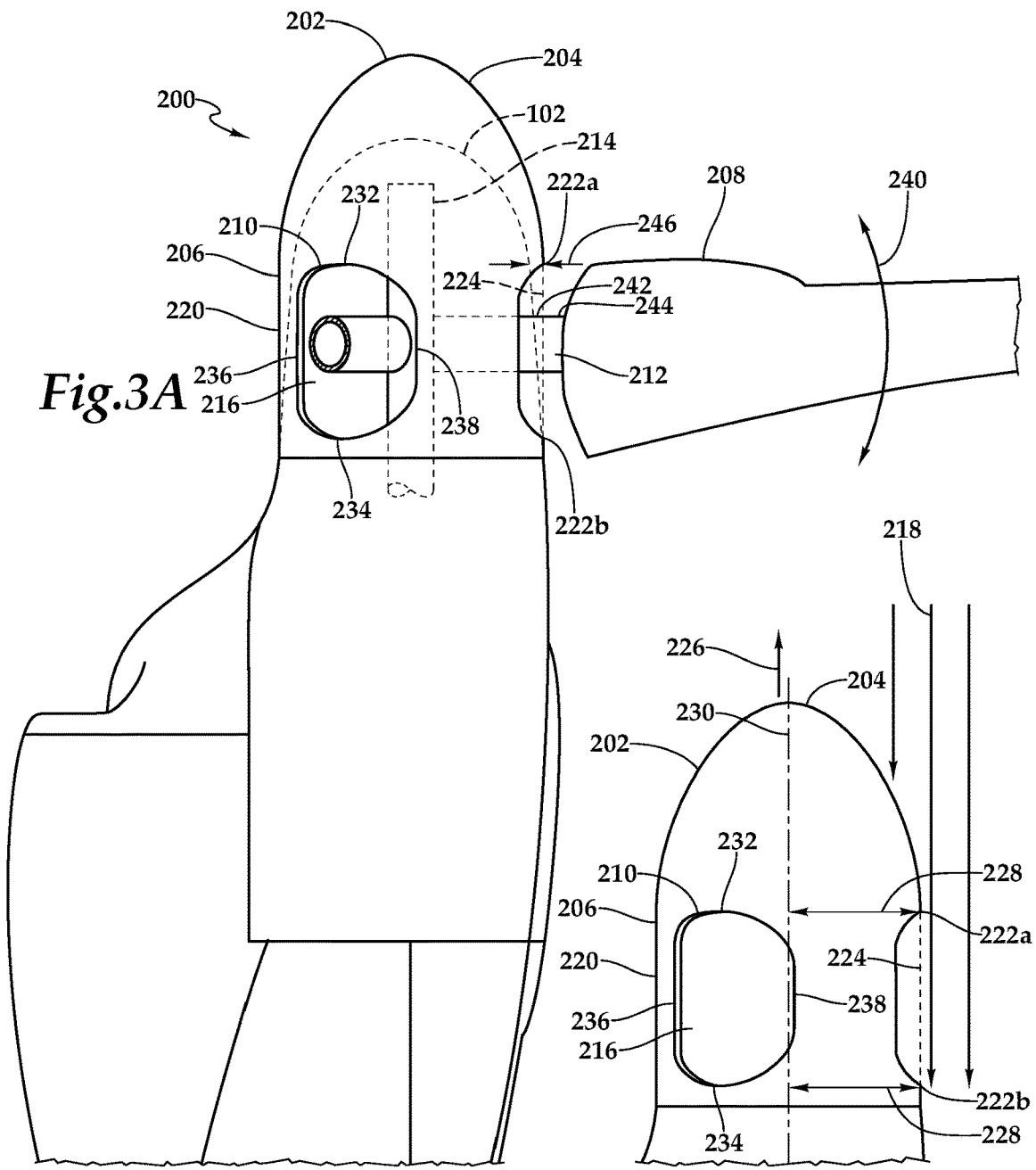
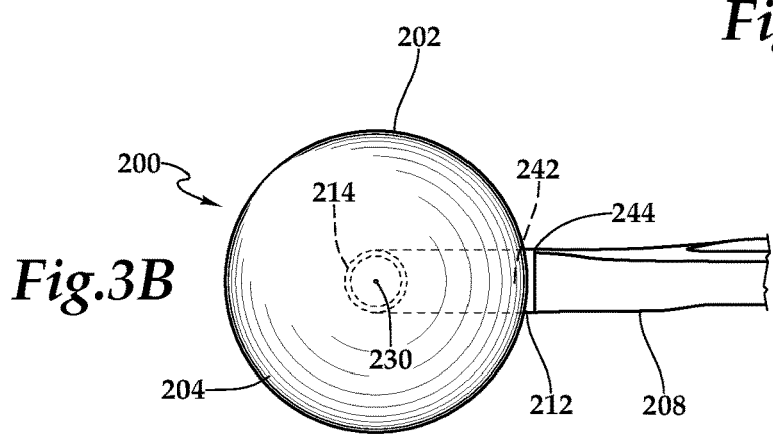

SPINNERS FOR USE ON TILTROTOR AIRCRAFT

TECHNICAL FIELD OF THE DISCLOSURE

The present disclosure relates, in general, to spinners for use on aircraft and, in particular, to elongated spinners having rotor blade cutouts oriented to reduce the drag experienced by tiltrotor aircraft.

BACKGROUND

The hub of an aircraft proprotor or propeller is typically covered by a spinner. Typically, spinners have an aerodynamic shape that streamlines an aircraft and helps to smoothen the airflow through the blades of the proprotor or propeller and over the surfaces aft of the proprotor or propeller. The blades of a proprotor or propeller may radially protrude from the spinner via cutouts, or holes, in the spinner. The cutouts may allow the blades to flap or move in various directions, including the fore-aft and lead-lag directions, and also allow the blades to pitch at various angles. Current spinner and cutout configurations, however, present a number of drag issues for the aircraft. For example, airflow during forward flight can enter the spinner through the cutouts, thereby creating ram drag. Cutouts may expose large portions of the blade shanks to freestream airflow, further causing ram or profile drag. The exchange of air into and out of the cutouts contributes to the momentum drag experienced by the aircraft. Also, current spinners are shaped such that air pressure is at a maximum near the cutouts, which leads to high air velocity and increased dynamic pressure near the cutouts and a further increase in the aforementioned drag effects. Previous techniques for reducing cutout-induced drag, such as sliding seals, have reliability and maintenance disadvantages and add undue weight, cost and complexity. Accordingly, a need has arisen for spinner and cutout configurations that reduce the various types of drag caused by current spinners while avoiding unnecessary weight, cost and complexity.

SUMMARY

In a first aspect, the present disclosure is directed to a proprotor assembly for a tiltrotor aircraft having a forward flight mode. The proprotor assembly includes a spinner subjected to freestream airflow during forward flight. The spinner has a tapered leading portion and a substantially cylindrical aft portion. The spinner forms a plurality of rotor blade cutouts exposing an inner chamber. The proprotor assembly includes a plurality of proprotor blade assemblies protruding radially from the spinner through the rotor blade cutouts. The rotor blade cutouts are formed at the substantially cylindrical aft portion of the spinner to reduce the freestream airflow into the inner chamber via the rotor blade cutouts during forward flight, thereby reducing drag experienced by the tiltrotor aircraft.

In some embodiments, the substantially cylindrical aft portion of the spinner may have an outer surface substantially parallel with the freestream airflow during forward flight. In certain embodiments, the rotor blade cutouts may be aligned with the freestream airflow such that air substantially bypasses the inner chamber during forward flight. In some embodiments, placement of the rotor blade cutouts at the substantially cylindrical aft portion of the spinner may reduce exposure of the inner chamber of the spinner to freestream airflow during forward flight. In certain embodiments, the rotor blade cutouts may be oriented substantially parallel to the freestream airflow during forward flight. In some embodiments, the rotor blade cutouts each may include a leading edge and a trailing edge forming an axis, the axes of the rotor blade cutouts each substantially parallel to the freestream airflow during forward flight. In certain embodiments, the tiltrotor aircraft moves in a forward direction during forward flight and the rotor blade cutouts may each include a leading edge and a trailing edge forming an axis, the axes of the rotor blade cutouts each substantially parallel to the forward direction.

In some embodiments, the spinner may have a central axis extending therethrough, the rotor blade cutouts may each include a leading edge and a trailing edge, the leading edge of each rotor blade cutout may have a distance L from the central axis, the trailing edge of each rotor blade cutout may have a distance T from the central axis and L may be substantially equal to T. In certain embodiments, the rotor blade cutouts may each form an oval shape. In some embodiments, the rotor blade cutouts may each further comprise a leading side, a trailing side, a first lateral side and a second lateral side. In such embodiments, the leading and trailing sides may be curved and the first and second lateral sides may be substantially straight. In certain embodiments, reduction of the freestream airflow into the inner chamber may reduce air exchange through the rotor blade cutouts, thereby reducing momentum drag experienced by the tiltrotor aircraft.

In some embodiments, the proprotor blade assemblies may each include a shank extending through a respective one of the rotor blade cutouts, and placement of the rotor blade cutouts at the substantially cylindrical aft portion of the spinner may shield an increased portion of each shank from the freestream airflow during forward flight, thereby reducing drag caused by the shanks. In certain embodiments, the spinner may be elongated to reduce air pressure and air velocity adjacent to the rotor blade cutouts, thereby reducing drag attributable to the rotor blade cutouts during forward flight. In some embodiments, airflow over the spinner during forward flight may experience a pressure spike, and the spinner may be elongated to increase the distance between the pressure spike and the rotor blade cutouts, thereby minimizing air pressure and air velocity adjacent to the rotor blade cutouts and rotor blade shanks during forward flight. In certain embodiments, the rotor blade cutouts may each have a leading edge, and the spinner may include a plurality of diverter brows, each of which may be aerodynamically optimized and disposed adjacent to the leading edge of a respective rotor blade cutout to divert airflow away from the rotor blade cutouts. In some embodiments, the diverter brows may each have a rounded forward edge. In certain embodiments, the diverter brows may each form an arch shape. In some embodiments, the diverter brows may each include a triangular flap. In some embodiments, the proprotor blade assemblies may each include a shank extending through a respective one of the rotor blade cutouts, and the diverter brows may radially protrude from the spinner to shield an increased portion of each shank from the freestream airflow during forward flight, thereby reducing drag caused by the shanks.

In a second aspect, the present disclosure is directed to a tiltrotor aircraft having a forward flight mode. The tiltrotor aircraft including a fuselage, a wing supported by the fuselage and at least one propulsion assembly coupled to the wing and including a proprotor assembly. The proprotor assembly includes a spinner subjected to freestream airflow during forward flight. The spinner has a tapered leading portion and a substantially cylindrical aft portion. The spinner forms a plurality of rotor blade cutouts exposing an inner chamber. The proprotor assembly includes a plurality of proprotor blade assemblies protruding radially from the spinner through the rotor blade cutouts. The rotor blade cutouts are formed at the substantially cylindrical aft portion of the spinner to reduce freestream airflow into the inner chamber via the rotor blade cutouts during forward flight, thereby reducing drag experienced by the tiltrotor aircraft.

In some embodiments, the propulsion assembly may include a fixed nacelle coupled to the wing and a pylon assembly rotatably coupled to the fixed nacelle, the pylon assembly including the proprotor assembly. In certain embodiments, the spinner may be rotatable relative to the pylon assembly. In some embodiments, reduction of the freestream airflow into the inner chamber may reduce ram drag experienced by the tiltrotor aircraft. In certain embodiments, the proprotor blade assemblies may include three or more proprotor blade assemblies and the rotor blade cutouts may include three or more rotor blade cutouts.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2C are various views of a proprotor assembly utilizing a non-elongated spinner;

FIGS. 3A-3C are various views of a proprotor assembly utilizing an elongated spinner in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
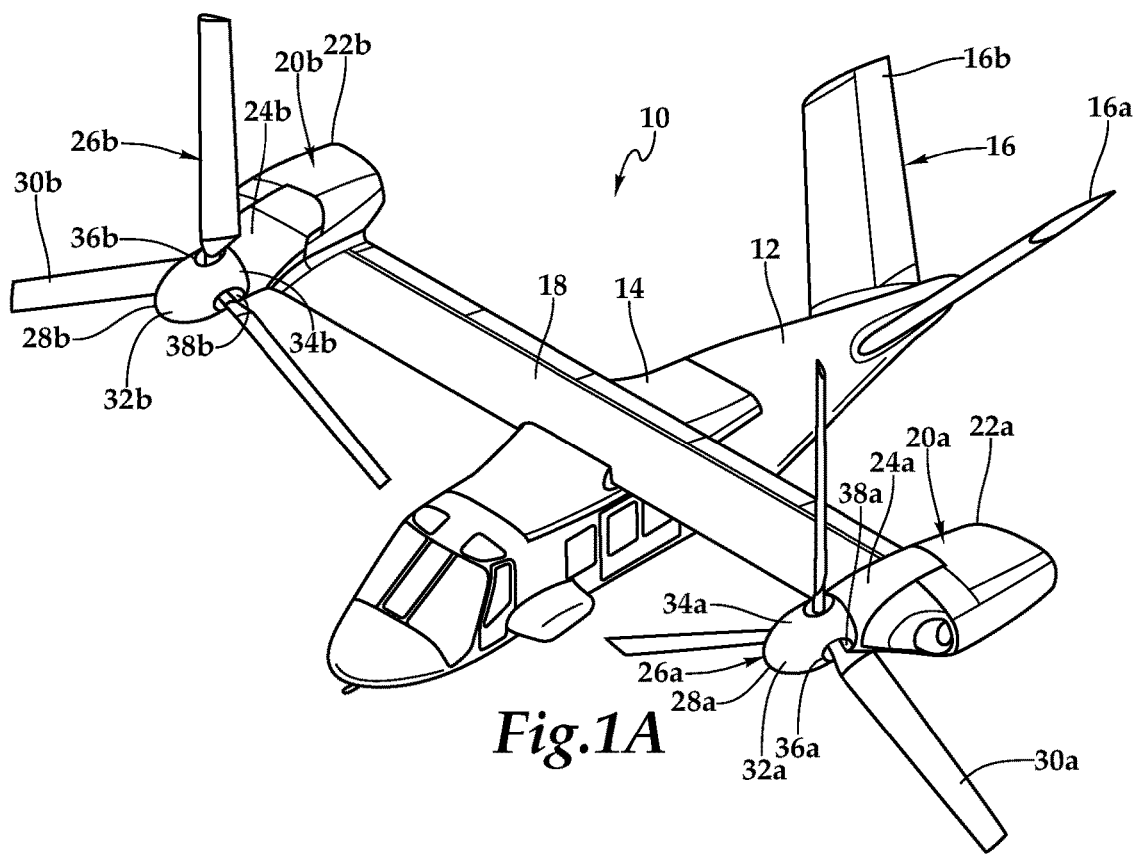
FIGS. 1A-1B are schematic illustrations of a tiltrotor aircraft having elongated spinners in accordance with embodiments of the present disclosure.
Figure 1B:
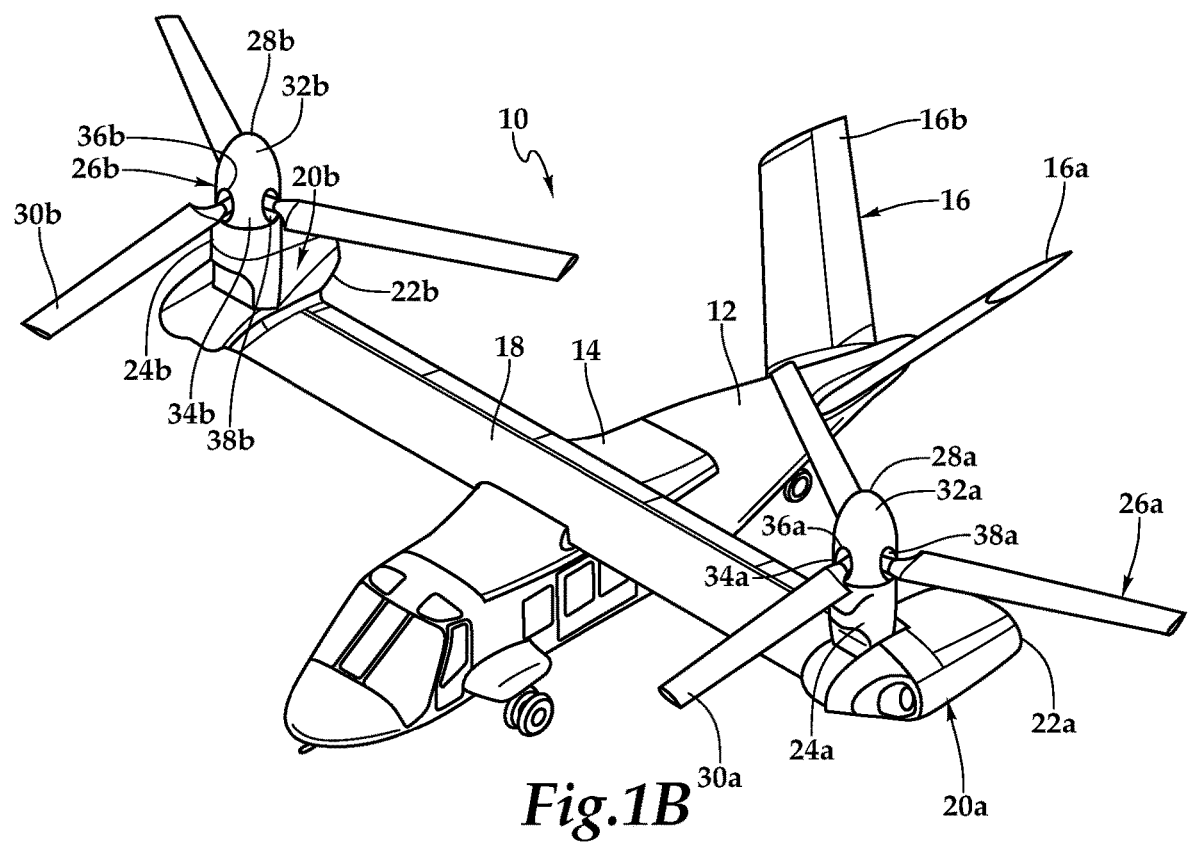

Referring to FIGS. 1A-1B in the drawing, a tiltrotor aircraft is schematically illustrated and generally designated 10. Tiltrotor aircraft 10 includes a fuselage 12, a wing mount assembly 14 and a tail section 16 including rotatably mounted tail members 16a, 16b having control surfaces operable for horizontal and/or vertical stabilization during forward flight. A wing 18 is supported by fuselage 12. Coupled to outboard ends of wing 18 are propulsion assemblies 20a, 20b. Propulsion assembly 20a includes a fixed nacelle 22a that is coupled to wing 18 and houses an engine and a transmission. In addition, propulsion assembly 20a includes a pylon assembly 24a that is rotatable relative to fixed nacelle 22a between a generally horizontal orientation, as best seen in FIG. 1A, and a generally vertical orientation, as best seen in FIG. 1B. Pylon assembly 24a includes a proprotor assembly 26a including spinner 28a and proprotor blade assemblies 30a, which is rotatable relative to pylon assembly 24a responsive to torque and rotational energy provided by a rotor hub assembly and drive system mechanically coupled to the engine and transmission. Similarly, propulsion assembly 20b includes a fixed nacelle 22b that houses an engine and transmission, a pylon assembly 24b that is rotatable relative to fixed nacelle 22b and a proprotor assembly 26b including spinner 28b and proprotor blade assemblies 30b, which is rotatable relative to pylon assembly 24b responsive to torque and rotational energy provided via a rotor hub assembly and drive system mechanically coupled to the engine and transmission housed by fixed nacelle 22b. As used herein, the term "coupled" may include direct or indirect coupling by any means, including moving and/or non-moving mechanical connections.

FIG. 1A illustrates tiltrotor aircraft 10 in airplane or forward flight mode, in which proprotor assemblies 26a, 26b are rotating in a substantially vertical plane to provide a forward thrust enabling wing 18 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 26a, 26b are rotating in a substantially horizontal plane to provide a lifting thrust such that tiltrotor aircraft 10 flies much like a conventional helicopter. It should be appreciated that tiltrotor aircraft 10 can be operated such that proprotor assemblies 26a, 26b are selectively positioned between forward flight mode and VTOL flight mode, which can be referred to as a conversion flight mode. Even though tiltrotor aircraft 10 has been described as having one engine in each fixed nacelle 22a, 22b, it should be appreciated by those having ordinary skill in the art that other engine arrangements are possible and are considered to be within the scope of the present disclosure including, for example, alternatively or additionally having an engine housed within fuselage 12 that provides torque and rotational energy to both proprotor assemblies 26a, 26b.

Spinners 28a, 28b are subjected to freestream airflow when tiltrotor aircraft 10 is in forward flight mode, as shown in FIG. 1A. Spinners 28a, 28b are elongated to form tapered leading portions 32a, 32b and substantially cylindrical aft portions 34a, 34b, respectively. Spinners 28a, 28b form rotor blade cutouts 36a, 36b that expose inner chambers 38a, 38b of spinners 28a, 28b, respectively. Proprotor blade assemblies 30a, 30b protrude radially from spinners 28a, 28b through rotor blade cutouts 36a, 36b, respectively. While the illustrated embodiment shows each proprotor assembly 26a, 26b to have three proprotor blade assemblies 30a, 30b and three rotor blade cutouts 36a, 36b, proprotor assemblies 26a, 26b may each include two, four, five or more proprotor blade assemblies and two, four, five or more rotor blade cutouts. Rotor blade cutouts 36a, 36b are formed at cylindrical aft portions 34a, 34b of spinners 28a, 28b, respectively. By locating rotor blade cutouts 36a, 36b at cylindrical aft portions 34a, 34b of spinners 28a, 28b, rotor blade cutouts 36a, 36b are substantially aligned or parallel with freestream airflow during forward flight such that the freestream airflow into inner chambers 38a, 38b of spinners 28a, 28b via rotor blade cutouts 36a, 36b is reduced, thereby reducing drag, including ram and momentum drag, experienced by tiltrotor aircraft 10.

It should be appreciated that tiltrotor aircraft 10 is merely illustrative of a variety of aircraft that can implement the embodiments disclosed herein. Indeed, spinners 28a, 28b may be used on any aircraft that utilizes a proprotor, propeller or rotor-based propulsion system. Other aircraft implementations can include hybrid aircraft, tiltwing aircraft, quad tiltrotor aircraft, unmanned aircraft, gyrocopters, airplanes, helicopters and the like. As such, those of ordinary skill in the art will recognize that spinners 28a, 28b can be integrated into a variety of aircraft configurations. It should be appreciated that even though aircraft are particularly well suited to implement the embodiments of the present disclosure, non-aircraft vehicles and devices can also implement the embodiments, including, but not limited to, automobiles or land-based vehicles.

Referring to FIGS. 2A-2C in the drawings, a proprotor assembly for a tiltrotor aircraft is schematically illustrated and generally designated 100. Proprotor assembly 100 includes a non-elongated spinner 102 from which three proprotor blade assemblies 104 protrude. Proprotor blade assemblies 104 include shanks 106 connecting proprotor blade assemblies 104 to a mast 108 via a rotor hub (not shown). Rotor blade cutouts 110 formed in spinner 102 provide holes through which shanks 106 connect proprotor blade assemblies 104 to mast 108. Rotor blade cutouts 110 accommodate the flapping envelope of proprotor blade assemblies 104, including flapping in the fore-aft direction 112. Rotor blade cutouts 110 may also accommodate lead-lag and pitching movements of proprotor blade assemblies 104.

In some applications, the flapping envelope of proprotor blade assemblies 104 may be expanded to increase control power in low speed and hover operations, as well as increase overall agility. For example, flapping in fore-aft direction 112 may be expanded to a range between 12 and 18 degrees, such as 15 degrees, whereas previous tiltrotor aircraft may require a flapping envelope of 10.5 degrees or less. Larger rotor blade cutouts 110 may be necessary to accommodate such an expanded flapping envelope. Larger rotor blade cutouts 110, however, present a severe drag penalty for the tiltrotor aircraft when formed by non-elongated spinner 102, whose surface is tapered relative to freestream airflow 114. Because rotor blade cutouts 110 are formed on the tapered surface of spinner 102, inner chamber 116 of spinner 102 is exposed to freestream airflow 114 during forward flight, as best seen in FIGS. 2B and 2C, thereby creating ram and momentum drag for the tiltrotor aircraft. FIG. 2B shows the resulting profiles 118 of rotor blade cutouts 110 relative to freestream airflow 114 that create ram and momentum drag issues. Placement of rotor blade cutouts 110 on the tapered surface of spinner 102 causes leading edges 120a to have a distance 122 from central axis 124 of spinner 102 that is less than distance 126 between trailing edges 120b of rotor blade cutouts 110 and central axis 124. Thus, leading edges 120a are disposed more radially inward than trailing edges 120b. Such a configuration causes rotor blade cutouts 110 to be nonaligned with freestream airflow 114 to which spinner 102 is subjected during forward flight.

Nonaligned rotor blade cutouts 110 also cause air exchange 130 between inner chamber 116 and the outside environment via rotor blade cutouts 110 during forward flight, which causes momentum drag for the tiltrotor aircraft. Air exchange 130 may be further exacerbated by swirling air 132 within inner chamber 116, which is caused by the entry of air into inner chamber 116 through rotor blade cutouts 110. Also, because leading edges 120a are more radially inward than trailing edges 120b, causing increased portions 134 of shanks 106 to be exposed to freestream airflow 114, the tiltrotor aircraft experiences additional profile drag. Accordingly, a need has arisen for an improved spinner that reduces or eliminates the drag-inducing effects caused by non-elongated spinner 102.

Referring to FIGS. 3A-3C in the drawings, a proprotor assembly for a tiltrotor aircraft is schematically illustrated and generally designated 200. Proprotor assembly 200 includes spinner 202, which is elongated to form a tapered leading portion 204 and a substantially cylindrical aft portion 206. Proprotor blade assemblies 208 protrude radially from spinner 202 through rotor blade cutouts 210 formed in spinner 202. Proprotor blade assemblies 208 are coupled, via shanks 212 and a rotor hub (not shown), to mast 214 located in inner chamber 216 of spinner 202. A dotted outline of non-elongated spinner 102, which was described in FIGS. 2A-2C, is illustrated in FIG. 3A to contrast with the elongated spinner 202 of the illustrative embodiments.

Rotor blade cutouts 210 are formed on cylindrical aft portion 206 of spinner 202 to reduce or eliminate freestream airflow 218 into inner chamber 216 via rotor blade cutouts 210 during forward flight, thereby reducing various types of drag experienced by the tiltrotor aircraft. While rotor blade cutouts 210 may expose inner chamber 216 to the environment outside of spinner 202, placement of rotor blade cutouts 210 on cylindrical aft portion 206 of spinner 202 reduces or eliminates the exposure of inner chamber 216 to freestream airflow 218 during forward flight. As best seen in FIG. 3B, the projected frontal profile area of rotor blade cutouts 210 and inner chamber 216 is substantially reduced or eliminated by placing rotor blade cutouts 210 on cylindrical aft portion 206. FIG. 3B may be contrasted with FIG. 2B, in which projected profile area 118 of rotor blade cutouts 110 is substantially larger and therefore more likely to allow freestream airflow into inner chamber 116 of spinner 102 and cause drag. In the illustrative embodiments, rotor blade cutouts 210 are aligned and oriented substantially parallel to freestream airflow 218, as best seen in FIG. 3C, such that air substantially bypasses inner chamber 216 during forward flight. Cylindrical aft portion 206 has an outer surface 220 that is substantially parallel with freestream airflow 218 during forward flight, as best seen in FIG. 3C.

Rotor blade cutouts 210 each include leading edges 222a and trailing edges 222b that form axes 224, which may substantially bisect each rotor blade cutout 210. Axes 224 are each substantially parallel to freestream airflow 218 during forward flight. Axes 224 are also substantially parallel to a forward direction 226 of motion in which tiltrotor aircraft moves during forward flight. Unlike spinner 102 illustrated in FIGS. 2A-2C, leading and trailing edges 222a, 222b are each substantially the same distance 228 from central axis 230 extending through spinner 202.

Rotor blade cutouts 210 each have a generally oval or stadium shape. In particular, rotor blade cutouts 210 have leading and trailing sides 232, 234 that are curved or arched and lateral sides 236, 238 that are substantially straight. In other embodiments, rotor blade cutouts 210 may have other shapes than that which is illustrated, such as a rectangular, square, circular, triangular, irregular or other shape. Rotor blade cutouts 210 may be enlarged to accommodate expanded flapping envelopes for proprotor blade assemblies 208 in the fore-aft direction 240. For example, rotor blade cutouts 210 may be sized to accommodate fore-aft flapping of proprotor blade assemblies 208 in a range between 12 to 18 degrees, such as 15 degrees. In other embodiments, rotor blade cutouts 210 may be sized to accommodate fore-aft flapping of proprotor blade assemblies 208 of less than 12 degrees or greater than 18 degrees. Rotor blade cutouts 210 may also be sized to accommodate expanded lead-lag or pitching movement of proprotor blade assemblies 208. Inner chamber 216 may be any size or shape. For example, while inner chamber 216 is shown to provide fluid or air communication between rotor blade cutouts 210, inner chamber 216 may also include one or more cavities, voids or channels each adapted to contain shanks 212 or another portion of proprotor blade assemblies 208. Thus, inner chamber 216 may have any spatial configuration and be comprised of any number of individual inner chambers.

Elongated spinner 202 reduces the drag on the tiltrotor aircraft in several respects. The alignment of rotor blade cutouts 210 with streamwise or freestream airflow over spinner 202 in forward flight reduces the exposed frontal area of rotor blade cutouts 210, as best seen in FIG. 3B, thereby reducing the associated ram drag. The reduction of freestream airflow 218 into inner chamber 216 via rotor blade cutouts 210 also reduces momentum drag by reducing the air exchanged into and out of spinner 202. By aligning rotor blade cutouts 210 to be parallel with freestream airflow 218, spinner 202 is wider at the location of shanks 212 such that increased portions 242 of shanks 212 are enclosed within spinner 202, thereby exposing reduced portions 244 of shanks 212 to freestream airflow 218 to minimize profile drag. The placement of rotor blade cutouts 210 on cylindrical aft portion 206 shields increased portions 242 of shanks 212 by a distance 246 from freestream airflow 218 during forward flight. FIG. 3B may be contrasted to FIG. 2B, in which increased portion 134 was exposed to freestream airflow due to the leading edges of the rotor blade cutouts being more radially inward than the trailing edges of the rotor blade cutouts. Spinner 202 also minimizes drag on the tiltrotor aircraft by optimizing the airflow pressure along the length of spinner 202 such that air pressure and air velocity are reduced or minimized adjacent to rotor blade cutouts 210, as described in FIG. 4 below. Spinner 202 achieves reduced drag for the tiltrotor aircraft without adding an undue amount of weight, size or complexity to the tiltrotor aircraft.

Figure 4:
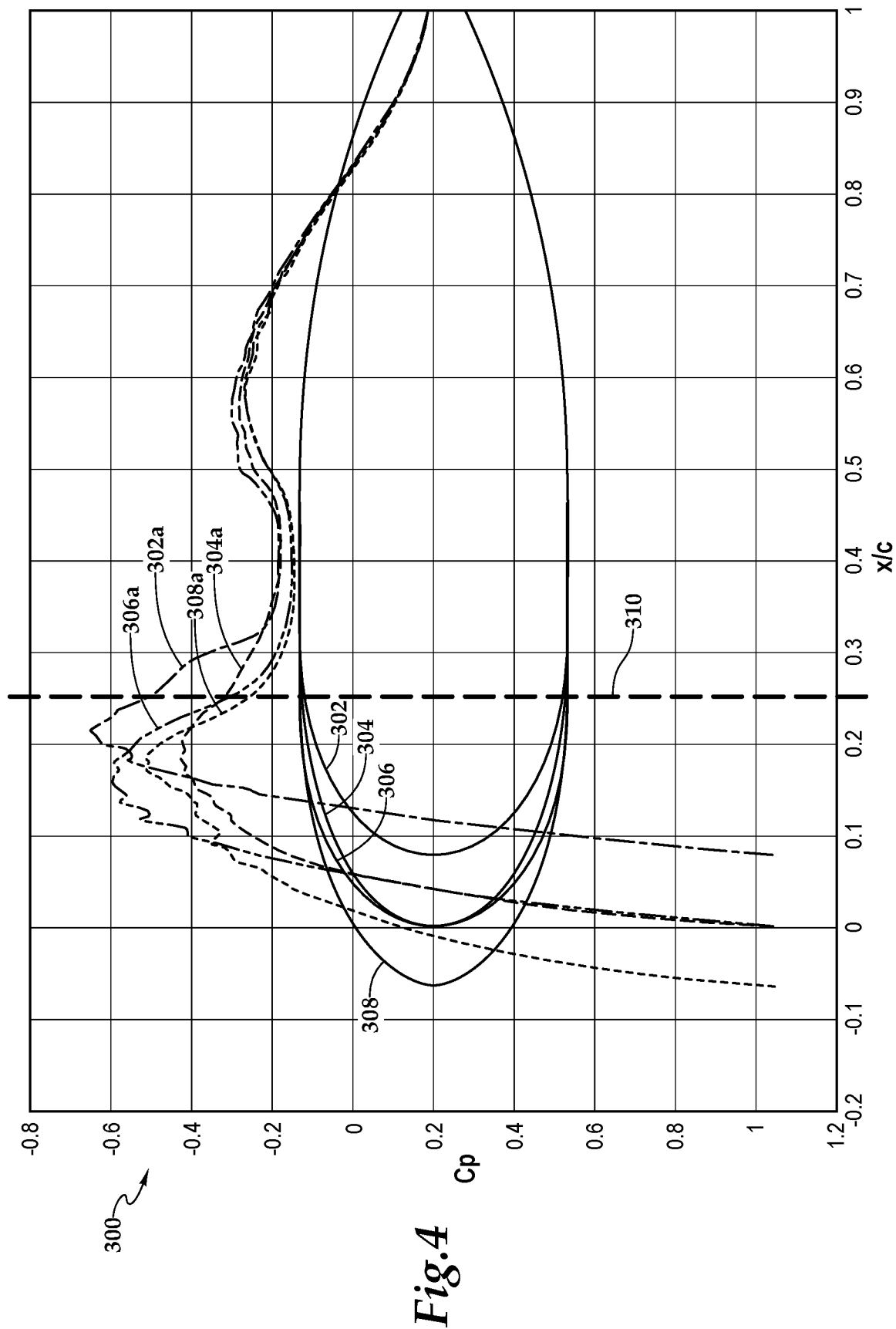
FIG. 4 is a graph illustrating surface pressure coefficients along the lengths of various spinner shapes.
Figure 5A:
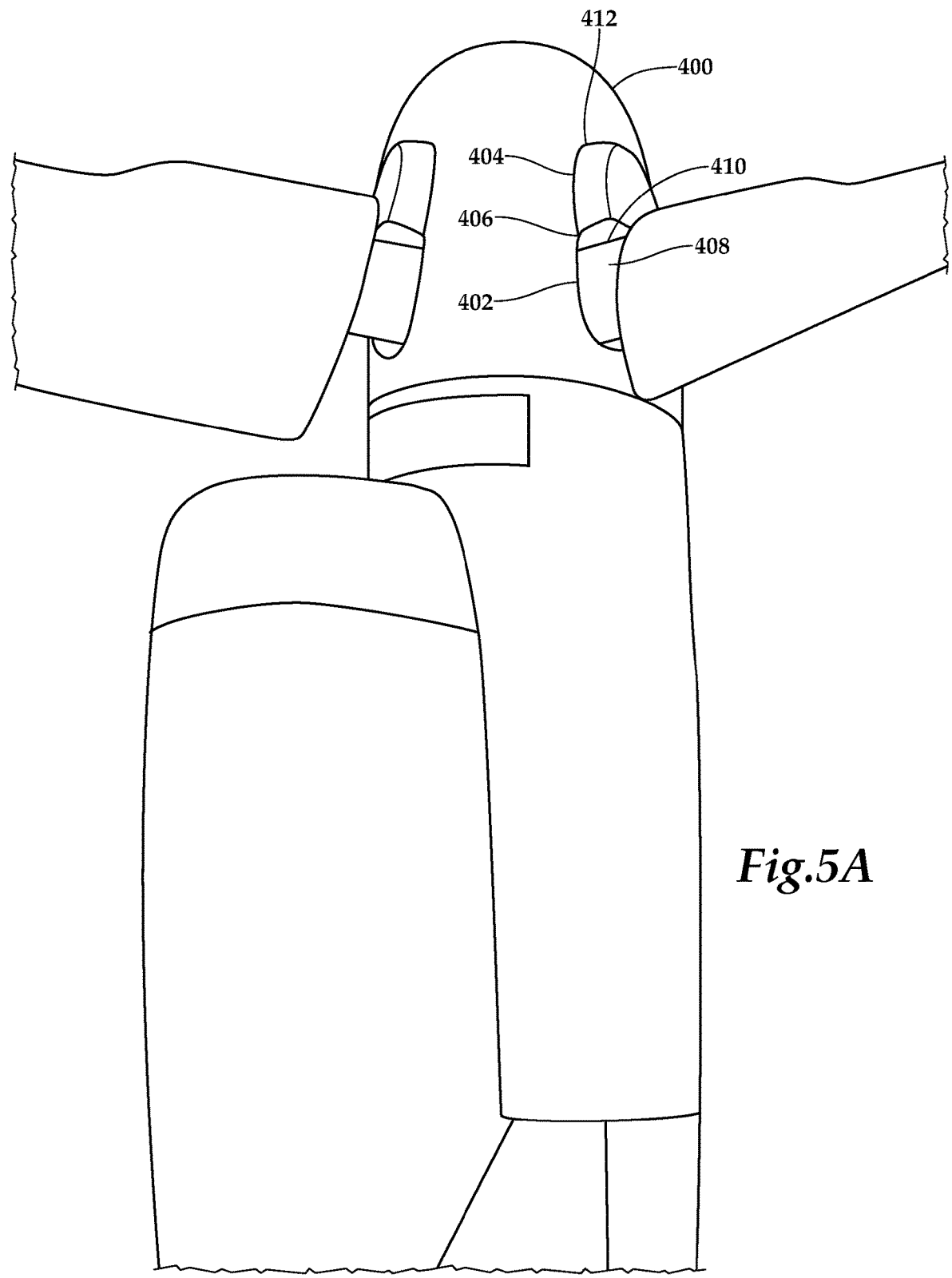
FIGS. 5A-5D are various views of an elongated spinner having arch-shaped diverter brows in accordance with embodiments of the present disclosure.
Figure 5B:
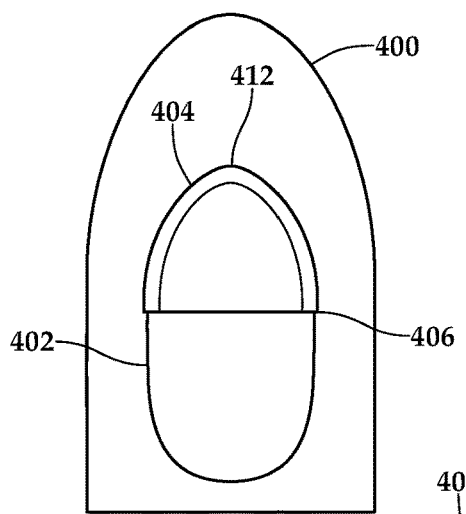
Figure 5C:
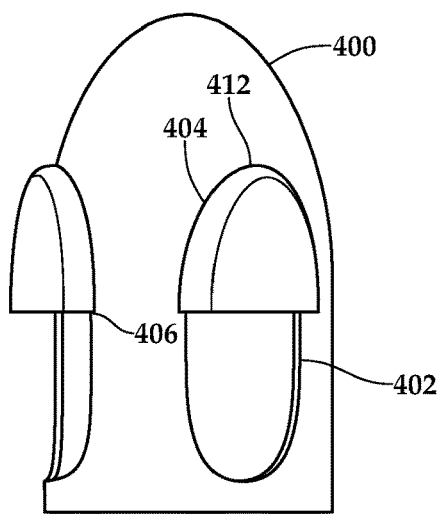
Figure 5D:
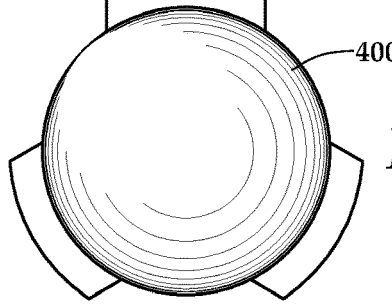

Referring to FIG. 4 in the drawings, a graph illustrating surface pressure coefficients along the lengths of various spinner shapes is schematically illustrated and generally designated 300. Graph 300 also shows the impact that various spinner shapes have on the location of the air pressure spike experienced by such spinners. In graph 300, spinner 302 corresponds to pressure coefficient curve 302a, spinner 304 corresponds to pressure coefficient curve 304a, spinner 306 corresponds to pressure coefficient curve 306a and spinner 308 corresponds to pressure coefficient curve 308a. The location of the leading edge of the rotor blade cutouts on the illustrated spinners is represented in graph 300 by line 310. The nose shape and overall length of the spinners of the illustrative embodiments are configured so that the air pressure spike occurs in front of rotor blade cutouts 310 and the airflow has decelerated prior to reaching rotor blade cutouts 310 and proprotor blade assembly shanks, thereby reducing the drag caused by rotor blade cutouts 310 and proprotor blade assembly shanks. Spinners 304, 306 and 308 each have air pressures at rotor blade cutouts 310 that are lower than the air pressure for spinner 302, which is the stubbiest, shortest and least elongated of all the spinners in graph 300. The peaks, or magnitudes, of the pressure spikes for spinners 304, 306 and 308 are lower than the peak of the pressure spike for spinner 302, thereby reducing spinner skin friction drag for spinners 304, 306 and 308. Also, the pressure spike for spinners 304, 306 and 308 all occur further from rotor blade cutouts 310 than the pressure spike for spinner 302. Lower air pressure for spinners 304, 306 and 308 corresponds to a lower air velocity at rotor blade cutouts 310, and because drag is a function of air velocity, spinners 304, 306 and 308 cause a lower amount of drag than spinner 302. Thus, in the illustrative embodiments, the spinner is elongated such that air pressure and air velocity is reduced or minimized adjacent to rotor blade cutouts 310, thereby reducing the drag attributable to rotor blade cutouts 310 and proprotor blade assembly shanks during forward flight. Also in the illustrative embodiments, the tapered portion of the spinner may be shaped such that the peak, or magnitude, of the pressure spike caused by the spinner is reduced, which correspondingly reduces skin friction drag on the spinner.

The spinner of the illustrative embodiments may also be elongated such that the distance between rotor blade cutout 310 and the pressure spike along the surface of the spinner is increased, thereby providing more distance for pressure recovery so that the air velocity slows or stabilizes by the time it reaches rotor blade cutouts 310. The additional distance provided by the elongated spinner design provides additional room for the airflow to go around the leading portion or nose of the spinner and decelerate by the time it gets to rotor blade cutouts 310, thereby minimizing air pressure and air velocity adjacent to rotor blade cutouts 310 during forward flight. Shorter spinner designs, such as spinner 302, force air to accelerate more quickly around the leading portion of the spinner, thereby causing the associated pressure spike to occur closer to rotor blade cutouts 310, which can increase drag. Indeed, graph 300 illustrates that spinner 308, which is the most elongated of all the spinners, has the lowest pressure coefficient adjacent to rotor blade cutouts 310. Thus, ram drag may be reduced for elongated spinner designs because airflow thereover has a reduced pressure and velocity adjacent to rotor blade cutouts 310, causing less air to enter the spinner via rotor blade cutouts 310 and reducing the profile drag caused by the shanks protruding therefrom.

Figure 6A:
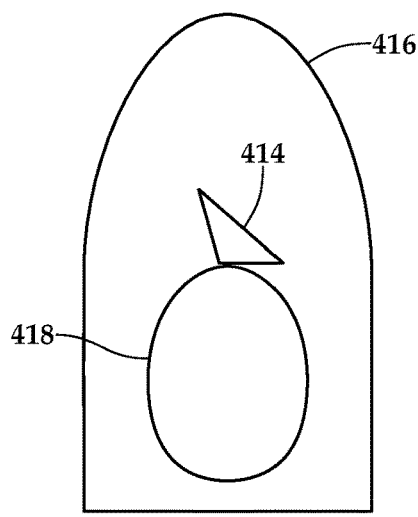
FIGS. 6A-6C are various views of an elongated spinner having diverter brow flaps in accordance with embodiments of the present disclosure.
Figure 6B:
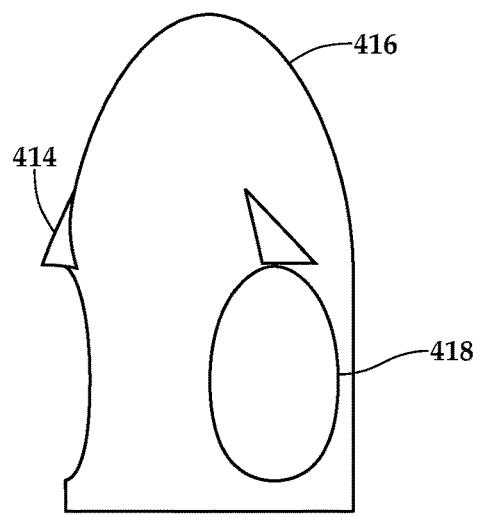
Figure 6C:
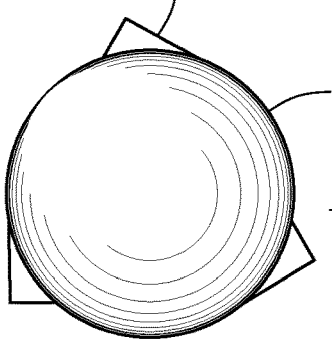

Referring to FIGS. 5A-5D and 6A-6C in the drawings, a variety of diverter brows are implemented on elongated spinners of the illustrative embodiments. Referring specifically to FIGS. 5A-5D, elongated spinner 400 forms rotor blade cutouts 402. Diverter brows 404 are each disposed adjacent leading edges 406 of respective rotor blade cutouts 402 to divert airflow away from rotor blade cutouts 402. Diverter brows 404 may be placed anywhere in front of rotor blade cutouts 402 to reduce the airflow into rotor blade cutouts 402 and minimize the airflow impinging on shanks 408. Diverter brows 404 radially protrude from spinner 400 to shield an increased portion 410 of shanks 408 from freestream airflow during forward flight, thereby reducing the drag caused by shanks 408. Diverter brows 404 have rounded forward edges 412 that approximate an arch shape. The forward edges of diverter brows 404 may also have other aerodynamic shapes, such as pointed, irregular or non-rounded shapes. For example, as shown in FIGS. 6A-6C, diverter brows 414 may each be a planar triangular flap that radially protrudes from spinner 416. The radial protrusion of triangular flaps 414 also shields an increased portion of each shank protruding from rotor blade cutouts 418. Diverter brows 404, 414 may protrude radially by any distance suitable for the application, and may be any shape that helps to reduce drag of the tiltrotor aircraft.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A proprotor assembly for a tiltrotor aircraft having a forward flight mode, the proprotor assembly comprising:
   a spinner subjected to freestream airflow during forward flight, the spinner having a tapered leading portion and a substantially cylindrical aft portion, the spinner forming a plurality of rotor blade cutouts exposing an inner chamber; and
   a plurality of proprotor blade assemblies protruding radially from the spinner through the rotor blade cutouts;
   wherein the rotor blade cutouts each further comprise a leading side, a trailing side, a first lateral side and a second lateral side;
   wherein the leading and trailing sides are curved and the first and second lateral sides are substantially straight to form a stadium shape;
   wherein the rotor blade cutouts are uniformly shaped;
   wherein the rotor blade cutouts each have a leading edge and the spinner further comprises a plurality of diverter brows each disposed adjacent to the leading edge of a respective rotor blade cutout to divert airflow away from the rotor blade cutouts;
   wherein the diverter brows each further comprise a substantially planar triangular flap extending radially outward and having an aft edge, the aft edges of the planar triangular flaps forward of the leading edges of the rotor blade cutouts; and
   wherein the rotor blade cutouts are formed in the substantially cylindrical aft portion of the spinner to reduce the freestream airflow into the inner chamber via the rotor blade cutouts during forward flight, thereby reducing drag experienced by the tiltrotor aircraft.

2. The proprotor assembly as recited in claim 1 wherein the substantially cylindrical aft portion of the spinner has an outer surface substantially parallel with the freestream airflow during forward flight.

3. The proprotor assembly as recited in claim 1 wherein the rotor blade cutouts are aligned with the freestream airflow such that air substantially bypasses the inner chamber during forward flight.

4. The proprotor assembly as recited in claim 1 wherein the rotor blade cutouts are oriented substantially parallel to the freestream airflow during forward flight.

5. The proprotor assembly as recited in claim 1 wherein the rotor blade cutouts each include the leading edge and a trailing edge forming an axis therebetween, the axes of the rotor blade cutouts each substantially parallel to the freestream airflow during forward flight.

6. The proprotor assembly as recited in claim 1 wherein the spinner has a central axis extending therethrough;
   wherein the rotor blade cutouts each include a trailing edge;
   wherein the leading edge of each rotor blade cutout has a distance L from the central axis and the trailing edge of each rotor blade cutout has a distance T from the central axis; and
   wherein L is substantially equal to T.

7. The proprotor assembly as recited in claim 1 wherein the proprotor blade assemblies each include a shank extending through a respective one of the rotor blade cutouts; and
   wherein placement of the rotor blade cutouts at the substantially cylindrical aft portion of the spinner shields an increased portion of each shank from the freestream airflow during forward flight, thereby reducing drag caused by the shanks.

8. The proprotor assembly as recited in claim 1 wherein the spinner is elongated to reduce air pressure and air velocity adjacent to the rotor blade cutouts, thereby reducing drag attributable to the rotor blade cutouts during forward flight.

9. The proprotor assembly as recited in claim 8 wherein airflow over the spinner during forward flight experiences a pressure spike; and
   wherein the spinner is elongated to increase the distance between the pressure spike and the rotor blade cutouts, thereby reducing air pressure and air velocity adjacent to the rotor blade cutouts during forward flight.

10. The proprotor assembly as recited in claim 1 wherein the diverter brows each have a rounded forward edge.

11. The proprotor assembly as recited in claim 1 wherein the proprotor blade assemblies each include a shank extending through a respective one of the rotor blade cutouts; and
    wherein the diverter brows radially protrude from the spinner to shield an increased portion of each shank from the freestream airflow during forward flight, thereby reducing drag caused by the shanks.

12. The proprotor assembly as recited in claim 1 wherein the rotor blade cutouts are enlarged and sized so as to accommodate a maximum fore-aft flapping of the proprotor blade assemblies of at least 12 degrees.

13. The proprotor assembly as recited in claim 1 wherein airflow over the spinner during forward flight experiences a pressure spike and the spinner is elongated such that the pressure spike occurs forward of the rotor blade cutouts during forward flight.

14. The proprotor assembly as recited in claim 1 wherein each planar triangular flap has a pointed and noncurved leading edge.

15. The proprotor assembly as recited in claim 1 wherein each planar triangular flap is coupled to the spinner along a single linear edge.

16. A tiltrotor aircraft having a forward flight mode, the tiltrotor aircraft comprising:
 a fuselage;
 a wing supported by the fuselage; and
 at least one propulsion assembly coupled to the wing, each propulsion assembly including a proprotor assembly comprising:
 a spinner subjected to freestream airflow during forward flight, the spinner having a tapered leading portion and a substantially cylindrical aft portion, the spinner forming a plurality of rotor blade cutouts exposing an inner chamber; and
 a plurality of proprotor blade assemblies protruding radially from the spinner through the rotor blade cutouts;
 wherein the rotor blade cutouts each further comprise a leading side, a trailing side, a first lateral side and a second lateral side;
 wherein the leading and trailing sides are curved and the first and second lateral sides are substantially straight to form a stadium shape;
 wherein the rotor blade cutouts are uniformly shaped;
 wherein the rotor blade cutouts each have a leading edge and the spinner further comprises a plurality of diverter brows each disposed adjacent to the leading edge of a respective rotor blade cutout to divert airflow away from the rotor blade cutouts;
 wherein the diverter brows each further comprise a substantially planar triangular flap extending radially outward and having an aft edge, the aft edges of the planar triangular flaps forward of the leading edges of the rotor blade cutouts; and
 wherein the rotor blade cutouts are formed in the substantially cylindrical aft portion of the spinner to reduce freestream airflow into the inner chamber via the rotor blade cutouts during forward flight, thereby reducing drag experienced by the tiltrotor aircraft.

17. The tiltrotor aircraft as recited in claim 16 wherein the propulsion assembly further comprises:
 a fixed nacelle coupled to the wing; and
 a pylon assembly rotatably coupled to the fixed nacelle, the pylon assembly including the proprotor assembly.

18. The tiltrotor aircraft as recited in claim 17 wherein the spinner is rotatable relative to the pylon assembly.

19. The tiltrotor aircraft as recited in claim 16 wherein the plurality of proprotor blade assemblies further comprises three or more proprotor blade assemblies; and
 wherein the plurality of rotor blade cutouts further comprises three or more rotor blade cutouts.

\* \* \* \* \*